United States Patent
Konaje et al.

(10) Patent No.: US 11,429,403 B2
(45) Date of Patent: *Aug. 30, 2022

(54) PRE-GENERATING DATA FOR USER INTERFACE LATENCY IMPROVEMENT

(71) Applicant: Uber Technologies, Inc., San Francisco, CA (US)

(72) Inventors: Nayan Kumar Konaje, San Francisco, CA (US); Saguna Goel, San Francisco, CA (US); Tingting Huang, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/159,874

(22) Filed: Jan. 27, 2021

(65) Prior Publication Data
US 2021/0382732 A1      Dec. 9, 2021

Related U.S. Application Data

(63) Continuation of application No. 16/896,437, filed on Jun. 9, 2020, now Pat. No. 10,929,156.

(51) Int. Cl.
*G01C 21/34* (2006.01)
*G06F 9/451* (2018.01)
*G06Q 50/30* (2012.01)

(52) U.S. Cl.
CPC ......... *G06F 9/451* (2018.02); *G01C 21/3438* (2013.01); *G01C 21/3484* (2013.01); *G06Q 50/30* (2013.01)

(58) Field of Classification Search
CPC . G06F 9/451; G01C 21/3438; G01C 21/3484; G06Q 50/30
See application file for complete search history.

(56) References Cited

U.S. PATENT DOCUMENTS

| | | | |
|---|---|---|---|
| 10,180,332 B2 | 1/2019 | Yu | |
| 10,349,223 B1* | 7/2019 | Yoo | .......................... H04L 67/12 |
| 10,425,490 B2* | 9/2019 | Yamashita | .............. H04L 67/18 |
| 10,565,279 B2 | 2/2020 | Reddy | |
| 10,628,758 B2 | 4/2020 | Ikeda | |
| 10,701,759 B2 | 6/2020 | Pan | |
| 10,706,487 B1* | 7/2020 | Chachra | .................. H04W 4/40 |
| 10,708,733 B1 | 7/2020 | Yoo | |
| 10,929,156 B1* | 2/2021 | Konaje | .................. G06Q 50/30 |
| 10,976,172 B2* | 4/2021 | Dabholkar | ......... G01C 21/3679 |
| 11,006,479 B2* | 5/2021 | Pan | ........................ H04W 48/18 |
| 2014/0278051 A1* | 9/2014 | McGavran | ......... G01C 21/3492 |
| | | | 706/45 |
| 2015/0081362 A1* | 3/2015 | Chadwick | .............. G06Q 50/30 |
| | | | 705/7.14 |
| 2015/0161554 A1 | 6/2015 | Sweeney | |

(Continued)

*Primary Examiner* — Shen Shiau
(74) *Attorney, Agent, or Firm* — Mahamedi IP Law LLP

(57) ABSTRACT

A computing system can detect initiation data from a computing device indicating initiation of a client application. In response to detecting the initiation data, the system can determine one or more likely destinations of the user and generate data for a set of user interface features for each of the one or more likely destinations. The system can transmit the data for storage in a local memory of the computing device of the user before the computing system receives any specified destination from the user.

20 Claims, 5 Drawing Sheets

(56) References Cited

U.S. PATENT DOCUMENTS

| | | | |
|---|---|---|---|
| 2015/0247736 A1* | 9/2015 | Moore | G01C 21/367 |
| | | | 701/519 |
| 2017/0147989 A1* | 5/2017 | Onimaru | G06Q 10/1097 |
| 2018/0091604 A1* | 3/2018 | Yamashita | G06Q 20/28 |
| 2018/0095977 A1 | 4/2018 | Reddy | |
| 2018/0181910 A1* | 6/2018 | Zhang | G06Q 30/0207 |
| 2018/0188058 A1* | 7/2018 | Dabholkar | G01C 21/3617 |
| 2018/0202818 A1* | 7/2018 | Zhang | G06Q 10/063112 |
| 2018/0202821 A1 | 7/2018 | Yu | |
| 2018/0338298 A1 | 11/2018 | Pan | |
| 2019/0295206 A1 | 9/2019 | Yamashita | |
| 2020/0154245 A1* | 5/2020 | Zhang | H04W 4/029 |
| 2020/0326194 A1* | 10/2020 | Wang | G01C 21/343 |
| 2020/0410625 A1* | 12/2020 | Chachra | G06Q 50/30 |
| 2021/0304078 A1* | 9/2021 | Holland | G06Q 30/0208 |
| 2021/0342760 A1* | 11/2021 | Patel | G06Q 10/06311 |
| 2021/0348942 A1* | 11/2021 | Dubielzyk | G06Q 10/02 |

\* cited by examiner

PRE-GENERATING DATA FOR USER INTERFACE LATENCY IMPROVEMENT

CROSS REFERENCE TO RELATED APPLICATION

This application is a continuation of U.S. patent application Ser. No. 16/896,437, filed on Jun. 9, 2020, which is hereby incorporated by reference in its entirety.

BACKGROUND

Application user interface features displayed on computing devices can be reliant on real-time processing of data in response to user interactions with the application. For example, selection inputs of user interface features may cause the application to execute an algorithm to perform a set of calculations that can delay the presentation of certain user interface features until the set of calculations are performed and the resulting user interface features are generated.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
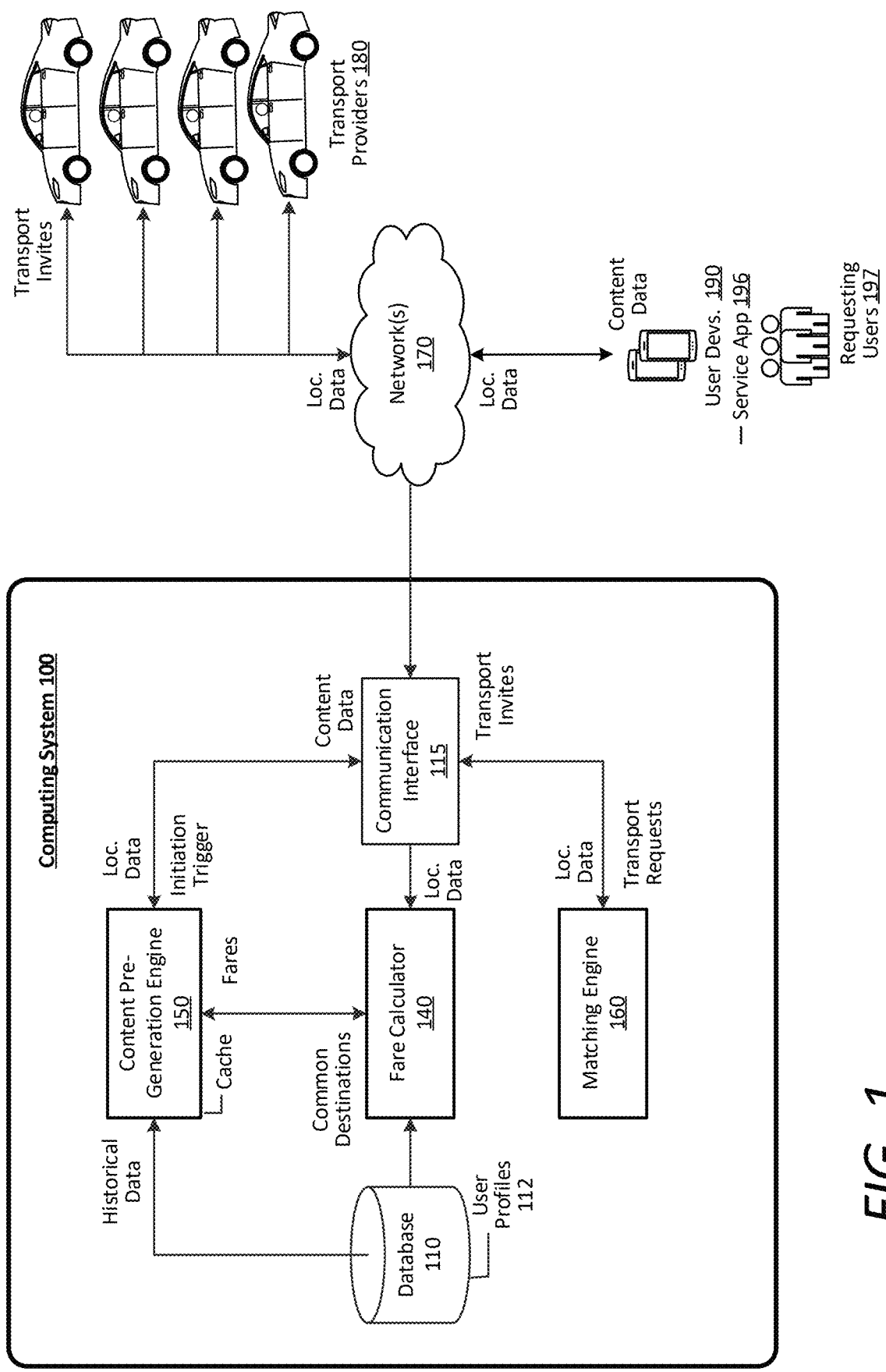
FIG. 1 is a block diagram illustrating an example computing system implementing graphical user interface (GUI) latency improvement functions, in accordance with examples described herein.

A computing system can communicate with computing devices of users of an application-based service, such as an on-demand transport service for ridesharing and/or goods delivery. The computing system can store a user profile for each user, which can include historical utilization data of the user. For example, the user profile can include common locations of interest of the user or prior destinations of the user, such as a work destination and a home destination, and further include preference information of the user, such as commonly used transport services (e.g., carpool, standard rideshare, food delivery, etc.). In certain implementations, the computing system can execute learning and predictive models based on the historical utilization data and current utilization data of each user to pre-generate user interface content prior to the user accessing such features. In further aspects, execution of the learning and predictive models can account for current context information of the user, such as the user's current location, to determine the user's intent (e.g., a probability that the user will engage a particular service accessible through the application).

In various implementations, the pre-generated content may then be cached or stored in local memory of the computing device of the user for ready presentation when the user provides the triggering inputs for such features. In one example, the computing system can determine current contextual information of the user, such as the user's current location, a time of day, and/or a day of the week, and determine one or more likely destinations to which the user may wish to be transported. Additionally or alternatively, the computing system can process the current contextual information to determine one or more on-demand services that the user is likely to request. Based on the current contextual information and the historical utilization data of the user, the computing system can pre-calculate a cost or fare (e.g., actual or estimated) for each of the likely destinations and pre-generate a set of user interface features in case the user provides a triggering input for those features. The computing system may then cache (store locally in memory at the client computing device) the pre-generated features for subsequent display when the triggering input is detected.

Accordingly, in caching the features, the computing system can associate each user interface feature with one or more triggering conditions. When a particular triggering condition is met, such as a user selection or input specifying of a particular service and/or destination, the computing system can cause the cached, pre-generated set of user interface features corresponding to the triggering condition to be displayed on the user interface of the application. It is contemplated that the techniques described herein can reduce display latency and improve the overall user experience, thereby increasing service engagement.

Among other benefits, examples described herein achieve a technical effect of decreasing GUI latency through pre-generation of user interface content prior to access by the user. In the context of on-demand transport, the computing system can be triggered (e.g., through detection of an application launch on a user's computing device) to determine a set of likely destinations of the user, determine transport supply information for those destinations given the user's current location, and pre-calculate a fare for each likely destination. Content corresponding to the pre-calculated fair may then be cached (e.g., either on the backend or on the computing device of the user) for ready display when the user selects one of the likely destinations.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example computing system implementing graphical user interface (GUI) latency improvement functions, in accordance with examples described herein. The computing system 100 can include a communication interface 115 that enables communications, over one or more networks 170, with computing devices of transport providers 180 of a transport service (e.g., rideshare, food delivery, etc.). The communication interface 115 further enables network communications with computing devices 190 of requesting users 197 of the transport service via a service application 196 (e.g. a rider application for the transport service). In doing so, a matching engine 160 of the computing system 100 can receive transport requests from the requesting users 197 and match the users 197 with transport providers 180 based on location data received from both the requesting users 197 and the transport providers 180.

In various implementations, the matching engine 160 can do so by transmitting transport invitations to transport providers 180 that are optimally situated to provide the transport service for each of the requesting users 197. On the user device 190, the requesting user 197 can interact with a GUI of the service application 196 to view transport services and their options. Each option can be associated with a fare, or estimated fare range, that is calculated based on the supply conditions of the transport providers 180. In previous implementations, a fare calculator 140 of the computing system 140 would be triggered to determine a set of fares upon selection of a particular service feature or a destination on the GUI of the service application 196. For example, if a requesting user 197 wishes to be transported to a particular destination, the requesting user 197 would first input the destination, which would trigger the fare calculator 140 to determine a set of fares for the various options for transport (e.g., standard rideshare, carpool, luxury vehicle, high capacity vehicle, etc.). The fares may then be presented on the GUI on content features selectable by the user 197 to request a particular service option.

The fare determination for each service option is non-trivial. As an example, the fare calculator 140 receives location data from the computing devices of a set of candidate transport providers 180 within a certain proximity of the requesting user 197. The fare calculator 140 may then determine a set of estimated times of arrival (ETAs) for each candidate transport provider 180 to pick up the requesting user 197 and then transport the user 197 to the destination. Based on these ETAs, the fare calculator 140 can determine a fare for each ride service option, and cause selectable user interface features on the GUI of the service application 196 to update and present the fares for each option.

It is contemplated that calculation of the fares upon receiving destination information from the requesting user 197 results in a certain amount of user interface latency on the GUI of the service application 196. For example, the calculation and presentation of the fares on the selection user interface features may result in a load time of one second or so. It is further contemplated that user experience is particularly dependent on user interface load times. For example, if a particular GUI feature of a content app takes more than one or two seconds to load, a typical user 197 may close the screen or move on to further content. Accordingly, even the slightest temporal changes in load times of GUI features can make a significant difference in user experience.

According to examples provided herein, the computing system 100 can include a content pre-generation engine 150 that can detect an initiation trigger corresponding to a requesting user 197 launching the service application 196 on the user's computing device 190. The computing system 100 can further include a database 110 storing user profiles 112 that indicate the requesting user's 197 historical utilization information corresponding to the transport service. This historical information can indicate common and likely destinations specific to the requesting user 197, such as a work location, a home location, an exercise or activity location, a car service location, an airport or train station, and the like.

Upon detecting an initiation trigger, the content pre-generation engine 150 can perform a search (e.g. in the profile 112 of the user 197) for historical data indicating the likely destinations of the user 197. The content pre-generation engine 150 can further interact with the fare calculator 140 by providing the likely destinations of the user 197. In certain examples, the content pre-generation engine 150 can filter the common destinations based on current contextual information. For example, if the user 197 is currently at a home location, the content pre-generation engine 150 can filter out the home location of the user 197 for the fare calculation.

In further implementations, the content pre-generation engine 150 can account for the day of the week and a current time of day to filter the common destinations. For example, if the user 197 has a typical weekly work schedule and it is currently a weekend, the content pre-generation engine 150 can filter out the user's work location. Accordingly, in various examples, the fare calculator 140 can determine the current location of the user 197 and provide a set of common or likely destinations to the fare calculator 140. The fare calculator 140 may then determine the supply conditions of the transport providers 180 and one or more candidate providers within a certain proximity of the user 197 to determine a set of fares for each transport option and to each potential destination of the user 197. Thus, prior to receiving the desired destination from the requesting user 197, the fare calculator 140, in coordination with the content pre-generation engine 150, can determine a set of fares for each possible destination of the user 197.

Using the set of fares for each possible destination, the content pre-generation engine 150 can pre-generate user interface features for ready display on the GUI of the service application 196 executing on the user's computing device 190. The content pre-generation engine 150 may then cache the pre-generated user interface features either in a local cache or on the user's computing device 190 via the service application 196. The pre-generated user interface features can comprise the fares for each service option and for each potential destination, as described herein. In certain implementations, the pre-generated user interface features can also be selectable to enable the user 197 to select a particular service option for transport to the selected or specified destination.

Accordingly, when the user 197 actually selects or inputs a destination, the pre-generated content corresponding to that destination may be presented without having to calculate the fares. User interface latency is therefore reduced, which is determined to enhance user engagement with the service application 196 and the transport service. It is contemplated that the pre-generation of user interface features corresponding to fare calculation to circumvent selection triggers that would normally cause the calculation can result in significant user interface latency reduction. It is further contemplated that such fare calculations need not be limited to on-demand transport, but may further be performed for additional services, such as food preparation and/or delivery, package delivery, and the like.

Still further, if the requesting user 197 selects a destination that has not been provided in the common destinations, then the fare calculator 140 can fall back to the default calculation method. Accordingly, the pre-generated user interface features can cause the service application 196 to run in an accelerated state, latency-wise, if one of the common destinations are selected or specified by the user 197. If the user 197 inputs an alternative destination, then the service application 196 will run in a legacy state with the fare calculation performed in response to receiving the destination information.

Computing Device

Figure 2:
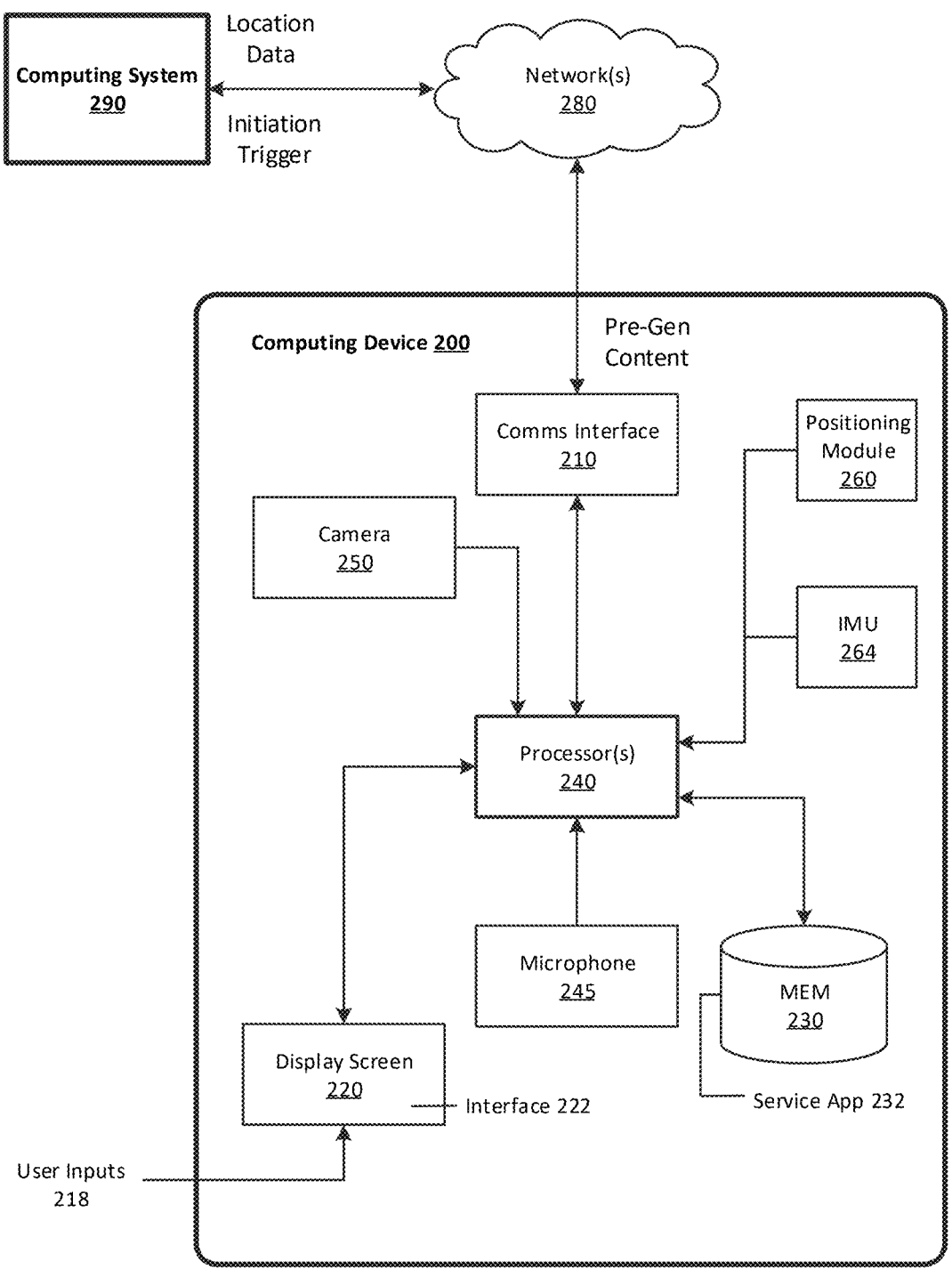
FIG. 2 is a block diagram illustrating an example computing device executing one or more service applications for communicating with a computing system, according to examples described herein.

FIG. 2 is a block diagram illustrating an example computing device executing a service application for communicating with a computing system, according to examples described herein. In many implementations, the computing device 200 can comprise a mobile computing device, such as a smartphone, tablet computer, laptop computer, VR or AR headset device, and the like. As such, the computing device 200 can include telephony features such as a microphone 245, a camera 250, and a communication interface 210 to communicate with external entities using any number of wireless communication protocols. The computing device 200 can further include a positioning module 260 (e.g., GPS) and an inertial measurement unit 264 that includes one or more accelerometers, gyroscopes, or magnetometers. In certain aspects, the computing device 200 can store a designated on-demand transport service application 232 in a memory 230. In variations, the memory 230 can store additional applications executable by one or more processors 240 of the computing device 200, enabling access and interaction with one or more host servers over one or more networks 280.

The computing device 200 can be operated by a requesting user 197 through execution of the on-demand service application 232. The computing device 200 can further be operated by a transport provider 190 through execution of a provider application. For requesting user 197 implementations, the user can select the service application 232 via a user input on the display screen 220, which can cause the service application 232 to be executed by the processor 240. In response, a user application interface 222 can be generated on the display screen 220, which can display available transport options and enable the user to configure and submit a transport request for a transport provider to transport the user to a destination.

As provided herein, the application 232 can enable a communication link with a computing system 290 over one or more networks 280, such as the computing system 100 as shown and described with respect to FIG. 1. The processor 240 can generate user interface features using content data received from the computing system 290 over network 280. Furthermore, as discussed herein, the application 232 can enable the computing system 290 to cause the generated user interface 222 to be displayed on the display screen 220.

In various examples, the positioning module 260 can provide location data indicating the current location of the users and transport providers to the computing system 290 to, for example, enable the computing system 290 to coordinate on-demand transport, as described herein. In examples described herein, the computing system 290 can transmit content data to the communication interface 210 of the computing device 200 over the network(s) 280. The content data can cause the executing service application 232 to display the user interface 222 for the executing application 232. Upon selection of a desired transport option by a requesting user, the service application 232 can cause the processor 240 to transmit a transport request to the computing system 290 to enable the computing system 290 to coordinate with transport providers to rendezvous with the users and transport them to their respective destinations.

According to examples described herein, when the requesting user 197 launches the service application 232, an initiation trigger is transmitted to the computing system 290, which causes the computing system 290 to determine a set of common destinations and determine a set of fares for each of the common destinations and pre-generate content indicating the fares, which may or may not end up being displayed on the user interface 222. In various implementations, the computing system 290 can filter the common destinations based on the current contextual information of the user, such as location data indicating the user's current location, a time of day, and/or a day of the week.

In various examples, the computing system 290 may then transmit the pre-generated content to the computing device 200. In some implementations, the computing system 290 can wait for a set of triggering conditions before transmitting the pre-generated content to the computing device 200. For example, the computing system 290 can await the user's selection of a particular destination prior to transmitting the pre-generated content. In variations, the computing system 290 can transmit the pre-generated content to be cached on the computing device 200 of the user. Thereafter, the service application 232 can monitor the user's interaction with the user interface 222, and once the triggering conditions are met (e.g., a selection of a particular destination), the service application 232 can immediately load the pre-generated content that corresponds to the triggering conditions from the cache.

Pre-Generated User Interface Features

Figure 3A:
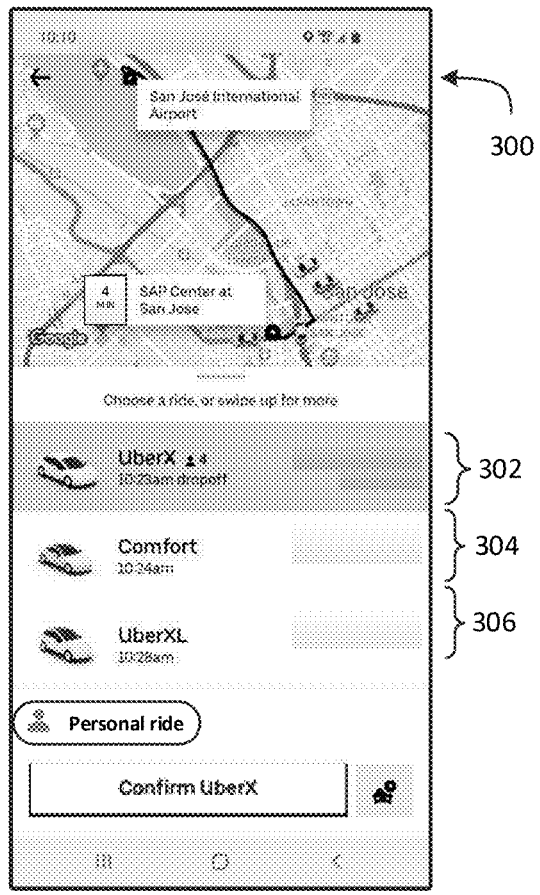
FIGS. 3A and 3B are example GUIs showing the pre-generated GUI content being presented, according to various examples.
Figure 3B:
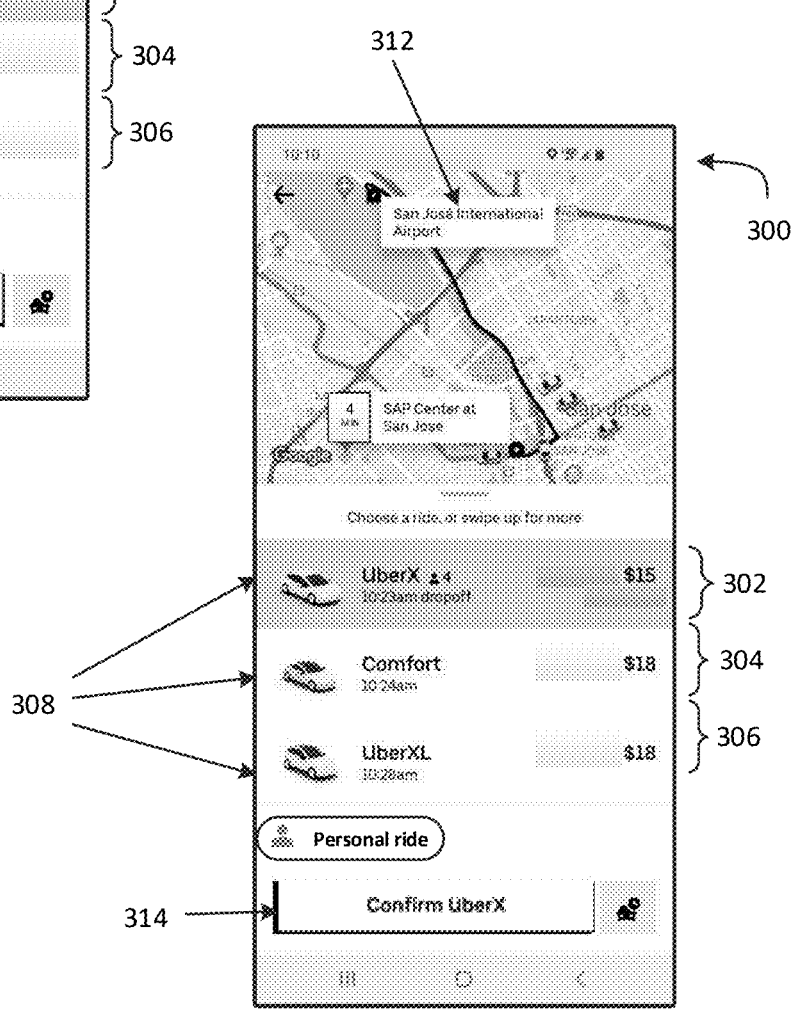

FIGS. 3A and 3B are example GUIs showing the pre-generated GUI content being presented, according to various examples. Referring to FIGS. 3A and 3B, a graphical user interface 300 of a service application for a transport service can include a set of service options 308 for a particular destination 312. As shown, the service options 308 can include a standard rideshare service, a comfort or luxury service, and a high-capacity vehicle service. In various examples, the service options can include additional options, such as a carpool option, food delivery option, package delivery option, and the like. The service options 308 can each be associated with a fare, such as an estimated fare or guaranteed fare for providing transport for the user.

According to various examples, each service option 308 can be included on a selectable user interface feature that enables the user to select the service option before confirming the service option on a confirmation button 314. Each service option 308 can also include a user interface feature 302, 304, 306 that displays the fare. In previous implementations, once the destination is selected or specified, a latency period tolls as the fare is calculated by the computing device 200 or backend computing system 100 (e.g., a load period between the user interface 300 shown in FIG. 3A, in which the fares are not yet shown, and the user interface 300 FIG. 3B, where the fares are presented). According to examples described herein, the user interface features 302, 304, 306 comprising the fares for each option are presented using pre-generated content based on calculations already performed prior to the user selecting the destination 312. Accordingly, the latency period for displaying the fares is significantly reduced from the previous implementation.

Methodology

Figure 4:
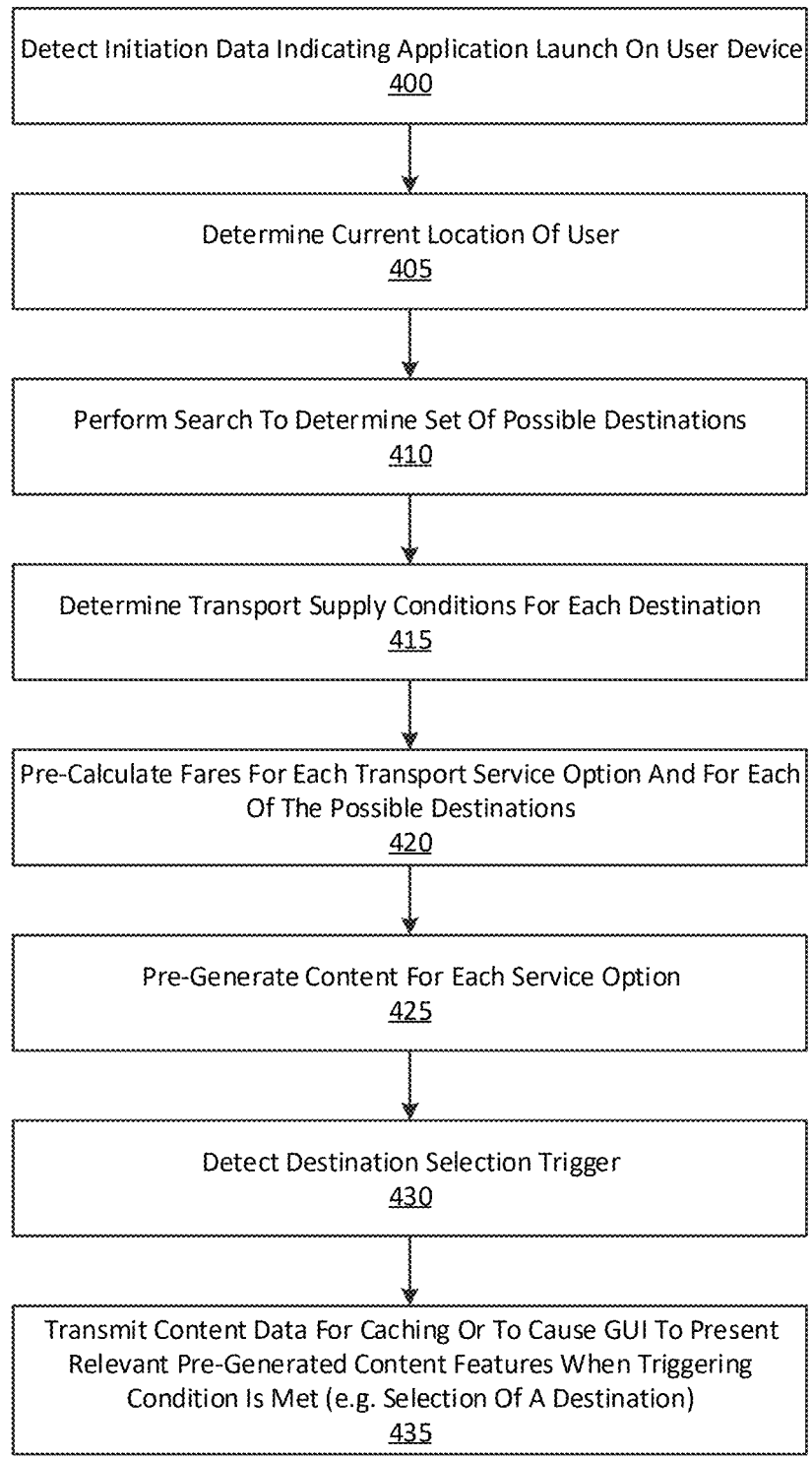
FIG. 4 is a flow chart describing an example method of pre-generating GUI content for display on a computing device of a user, according to various examples.

FIG. 4 is a flow chart describing an example method of pre-generating GUI content for display on a computing device of a user, according to various examples. In the below description of FIG. 4, reference may be made to reference characters representing like features as shown and described with respect to FIGS. 1 through 3B. Furthermore, the processes described in connection with FIG. 4 may be performed by a backend computing system 100, the computing device 190 of the user 197 via the executing service application 196, or a combination of both. Referring to FIG. 4, the computing system 100 can detect initiation data indicating the launch of the service application 196 on the computing device 190 of a user 197 (400). In various examples, the computing system 100 can receive location data from the computing device 190 to determine the current location of the user 197 (405).

The computing system 100 may then perform a search (e.g., in a user profile 112 of the requesting user 197) to determine a set of possible or likely destinations for which the user 197 typically requests transport (410). In various implementations, the computing system 100 can also determine the transport supply conditions for each destination (415). For example, the computing system 100 can determine whether the number of available transport providers 180 within a certain area in which the user 197 is located amounts to an oversupplied or undersupplied condition, which can affect the fare calculation. In further examples, the computing system 100 can select a representative transport provider 180 to determine an ETA to pick up the user 197 and an ETA to transport the user 197 to each possible or likely destination.

Based on such information, the computing system 100 can pre-calculate fares for each transport service option and for each of the possible destinations (420). The computing system 100 may then pre-generate data for user interface content (e.g., a set of user interface features) on which the fares are to be presented for each service option (425). In various examples, the computing system 100 may then transmit content data corresponding to the pre-generated user interface features to the computing device 190 for caching and/or for causing the user interface to present the relevant set of pre-generated content features when the triggering condition for the set of pre-generated content features is met (435). For example, the service application 196 can cache the pre-generated content features until the user selects or inputs one of the possible or likely destinations, at which point the relevant pre-generated user interface features corresponding to that destination may be presented. Accordingly, when the user 197 specifies one of the likely destinations, the computing system 100 can receive an indication of the specified destination, and transmit triggering data to the computing device 190 of the user 197 to cause the set of user interface features that correspond to the specified destination to be presented on the user interface of the client application 196.

Hardware Diagram

Figure 5:
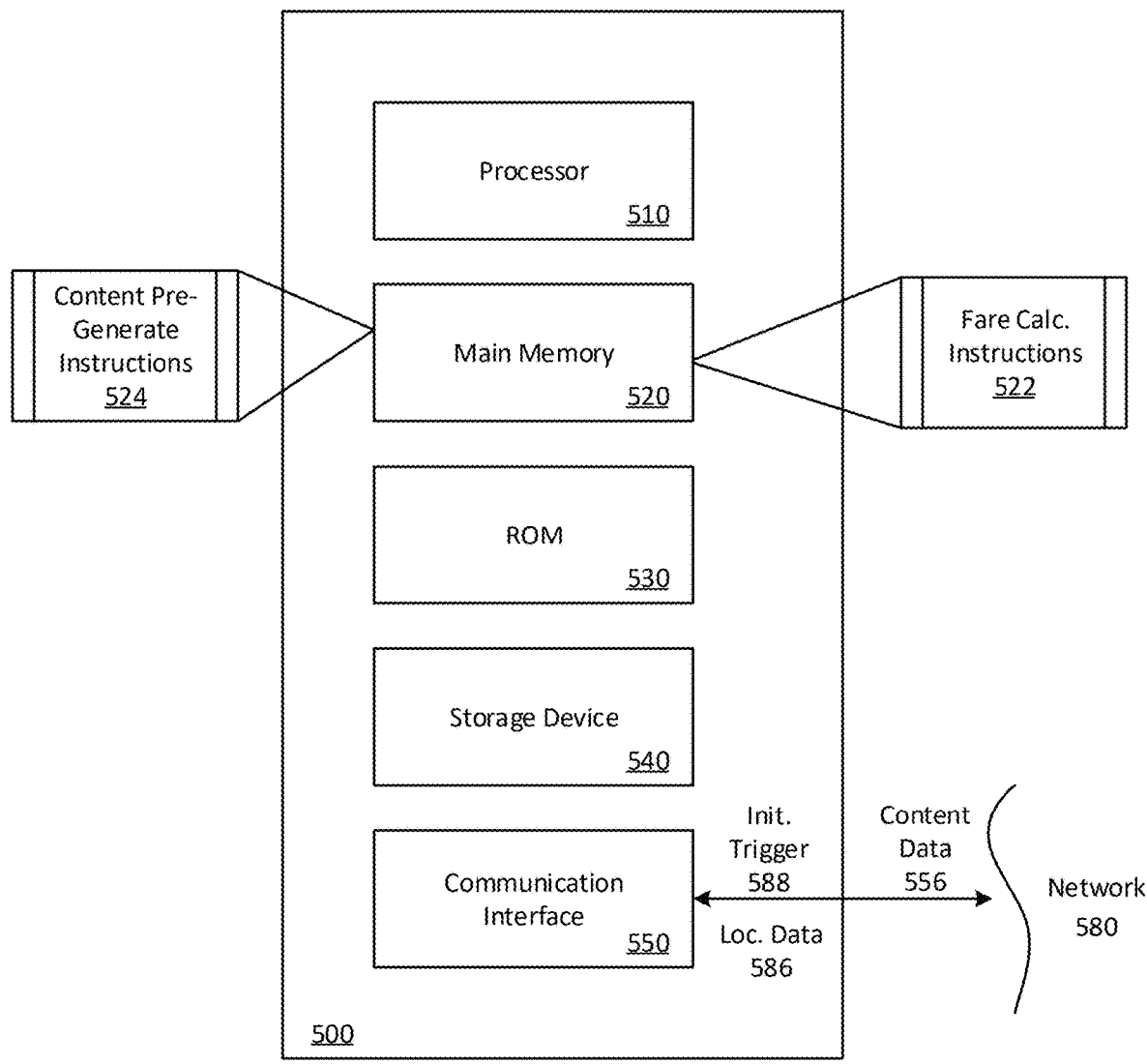
FIG. 5 is a block diagram that illustrates a computer system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network service, such as described in FIGS. 1 through 4. In the context of FIG. 1, the computer system 100 may be implemented using a computer system 500 such as described by FIG. 5. The computer system 100 may also be implemented using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., cellular network) through use of the network link (wireless or wired). Using the network link, the computer system 500 can communicate with one or more computing devices, one or more servers, one or more databases, and/or one or more self-driving vehicles. In accordance with examples, the computer system 500 receives initiation triggers, location data, and requests from mobile computing devices of individual users. The executable instructions stored in the memory 530 can include content pre-generation instructions 524 and fare calculation instructions 522.

By way of example, the instructions and data stored in the memory 520 can be executed by the processor 510 to implement the functions of an example computing system 100 of FIG. 1. In various examples, the processor 510 can execute the fare calculation instructions 522 to receive location data 586 from requesting users 197 and transport providers 180 and determine a set of fares for each service option to each possible destination, as described herein. The processor 510 can further execute the content pre-generation instructions 524 to detect initiation triggers 588 corresponding to user launches of the service application 196, perform searches to determine possible destinations, and pre-generate content 556 for displaying fares for each destination, according to examples described herein.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system comprising:
a network communication interface to communicate, over one or more networks, with computing devices of users;
one or more processors; and
a memory storing instructions that, when executed by the one or more processors, cause the computing system to:
detect, over the one or more networks, initiation data from a computing device of a user, the initiation data indicating initiation of a client application on the computing device of the user;
in response to detecting the initiation data, determine one or more likely destinations of the user before the computing system receives a specified destination from the user;
based on the one or more likely destinations, generate data for a set of user interface features for each of the one or more likely destinations for subsequent display on the computing device of the user before the computing system receives a specified destination from the user; and
transmit, to the computing device of the user, the data for each of the one or more likely destinations for storage in a local memory of the computing device of the user before the computing system receives any specified destination from the user, wherein when the user specifies a specified destination that is one of the one or more likely destinations, the client application retrieves a corresponding set of user interface features for the specified destination from the local memory of the computing device.

2. The computing system of claim 1, wherein the executed instructions further cause the computing system to:
determine current contextual information of the user, the current contextual information comprising at least one of a current location of the user, a time of day, or a day of the week.

3. The computing system of claim 2, wherein the executed instructions cause the computing system to further determine the one or more likely destinations based on the current contextual information of the user.

4. The computing system of claim 1, wherein the executed instructions further cause the computing system to:
associate each set of user interface features for each of the one or more destinations with at least one triggering condition.

5. The computing system of claim 4, wherein the computing device of the user retrieves the corresponding set of user interface features for the specified destination based on detecting the at least one triggering condition.

6. The computing system of claim 4, wherein the at least one triggering condition corresponds to a user input specifying the specified destination from the one or more likely destinations.

7. The computing system of claim 6, wherein the executed instructions cause the computing system to generate the data for the set of user interface features by pre-calculating a set of fares for each respective destination of the one or more likely destinations, and wherein the corresponding set of user interface features correspond to the set of pre-calculated fares for the specified destination.

8. The computing system of claim 7, wherein the computing device of the user presents each pre-calculated fare in the set of pre-calculated fares with a corresponding ride service of multiple ride services provided by a transport service facilitated by the computing system.

9. The computing system of claim 1, wherein the executed instructions further cause the computing system to:
generate a user profile for the user, the user profile comprising historical utilization data that corresponds to previous engagements by the user with a transport service;
wherein the executed instructions cause the computing system to determine the one or more likely destinations by performing the search using the user profile of the user.

10. The computing system of claim 1, wherein the computing device of the user displaying the set of user interface features corresponding to the specified destination decreases interface latency of a user interface of the client application displayed on the computing device.

11. A non-transitory computer readable medium storing instructions that, when executed by one or more processors of a computing system, cause the computing system to:
- detect, over one or more networks, initiation data from a computing device of a user, the initiation data indicating initiation of a client application on the computing device of the user;
- in response to detecting the initiation data, determine one or more likely destinations of the user before the computing system receives a specified destination from the user;
- based on the one or more likely destinations, generate data for a set of user interface features for each of the one or more likely destinations for subsequent display on the computing device of the user before the computing system receives a specified destination from the user; and
- transmit, to the computing device of the user, the data for each of the one or more likely destinations for storage in a local memory of the computing device of the user before the computing system receives any specified destination from the user, wherein when the user specifies a specified destination that is one of the one or more likely destinations, the client application retrieves a corresponding set of user interface features for the specified destination from the local memory of the computing device.

12. The non-transitory computer readable medium of claim 11, wherein the executed instructions further cause the computing system to:
- determine current contextual information of the user, the current contextual information comprising at least one of a current location of the user, a time of day, or a day of the week.

13. The non-transitory computer readable medium of claim 12, wherein the executed instructions cause the computing system to further determine the one or more likely destinations based on the current contextual information of the user.

14. The non-transitory computer readable medium of claim 11, wherein the executed instructions further cause the computing system to:
- associate each set of user interface features for each of the one or more destinations with at least one triggering condition.

15. The non-transitory computer readable medium of claim 14, wherein the computing device of the user retrieves the corresponding set of user interface features for the specified destination based on detecting the at least one triggering condition.

16. The non-transitory computer readable medium of claim 14, wherein the at least one triggering condition corresponds to a user input specifying the specified destination from the one or more likely destinations.

17. The non-transitory computer readable medium of claim 16, wherein the executed instructions cause the computing system to generate the data for the set of user interface features by pre-calculating a set of fares for each respective destination of the one or more likely destinations, and wherein the corresponding set of user interface features correspond to the set of pre-calculated fares for the specified destination.

18. A computer implemented method of improving user interface latency, the method being performed by one or more processors of a computing system and comprising:
- detecting, over one or more networks, initiation data from a computing device of a user, the initiation data indicating initiation of a client application on the computing device of the user;
- in response to detecting the initiation data, determining one or more likely destinations of the user before the computing system receives a specified destination from the user;
- based on the one or more likely destinations, generating data for a set of user interface features for each of the one or more likely destinations for subsequent display on the computing device of the user before the computing system receives a specified destination from the user; and
- transmitting, to the computing device of the user, the data for each of the one or more likely destinations for storage in a local memory of the computing device of the user before the computing system receives any specified destination from the user, wherein when the user specifies a specified destination that is one of the one or more likely destinations, the client application retrieves a corresponding set of user interface features for the specified destination from the local memory of the computing device.

19. The method of claim 18, further comprising:
- determining current contextual information of the user, the current contextual information comprising at least one of a current location of the user, a time of day, or a day of the week.

20. The method of claim 19, wherein the one or more processors further determine the one or more likely destinations based on the current contextual information of the user.

* * * * *